(12) United States Patent
Yu et al.

(10) Patent No.: US 7,559,076 B2
(45) Date of Patent: Jul. 7, 2009

(54) SAMPLE RATE REDUCTION IN DATA COMMUNICATION RECEIVERS

(75) Inventors: Tommy Yu, Orange, CA (US); Steven Jaffe, Irvine, CA (US); Stephen Edward Krafft, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 1316 days.

(21) Appl. No.: 10/184,770

(22) Filed: Jun. 28, 2002

(65) Prior Publication Data

US 2004/0003408 A1    Jan. 1, 2004

Related U.S. Application Data

(60) Provisional application No. 60/381,496, filed on May 17, 2002, provisional application No. 60/381,497, filed on May 17, 2002.

(51) Int. Cl.
*H04N 5/445* (2006.01)

(52) U.S. Cl. .............................. 725/85; 725/67; 725/68; 725/127; 725/151

(58) Field of Classification Search .................. 725/149, 725/85

See application file for complete search history.

(56) References Cited

U.S. PATENT DOCUMENTS

| | | | | |
|---|---|---|---|---|
| 5,295,162 A * | 3/1994 | Zarembowitch | ............. | 375/329 |
| 5,481,568 A * | 1/1996 | Yada | ........................ | 375/340 |
| 5,732,112 A * | 3/1998 | Langberg | ..................... | 375/349 |
| 6,208,701 B1 * | 3/2001 | Hiramatsu et al. | .......... | 375/354 |
| 6,411,250 B1 * | 6/2002 | Oswald et al. | ................ | 342/70 |
| 6,456,677 B1 * | 9/2002 | Hiramatsu et al. | .......... | 375/354 |
| 6,584,145 B1 * | 6/2003 | Camagna et al. | ............ | 375/216 |
| 6,900,381 B2 * | 5/2005 | Lindgren et al. | ............. | 84/603 |
| 7,082,174 B1 * | 7/2006 | Smee et al. | ................. | 375/349 |
| 2002/0169601 A1 * | 11/2002 | Nishio | ........................ | 704/205 |
| 2003/0154495 A1 * | 8/2003 | Sage | .......................... | 725/121 |
| 2004/0181811 A1 * | 9/2004 | Rakib | ......................... | 725/122 |
| 2004/0240590 A1 * | 12/2004 | Cameron et al. | ............ | 375/340 |
| 2005/0031097 A1 * | 2/2005 | Rabenko et al. | ............ | 379/93.31 |
| 2006/0015348 A1 * | 1/2006 | Cooper et al. | ............... | 704/500 |
| 2006/0084405 A1 * | 4/2006 | Smith | ......................... | 455/296 |
| 2006/0178759 A1 * | 8/2006 | Koehler | ....................... | 700/18 |

* cited by examiner

*Primary Examiner*—Vivek Srivastava
*Assistant Examiner*—Jivka Rabovianski
(74) *Attorney, Agent, or Firm*—Garlick Harrison & Markison; Shayne X. Short

(57) ABSTRACT

Sample rate reduction in data communication receivers. Digital sampling of analog data is performed using a reduced sample rate. The reduction factor may be any number of factors including a factor that divides the sample rate by a factor of two. The reduction of the sampling frequency is from a sampling frequency that is greater than twice the highest frequency component in an analog input signal. These analog input signals may be I and Q streams in certain embodiments. A digital interpolation filter may be employed to increase (up-convert) the sample rate of a digital signal before it is input to a VID filter that is used to recover the transmitted symbols from the over-sampled data stream. In this embodiment, this technique allows a front end of a communication receiver to be clocked at a lower sampling rate without affecting the performance of the VID filter.

35 Claims, 12 Drawing Sheets

US 7,559,076 B2

SAMPLE RATE REDUCTION IN DATA COMMUNICATION RECEIVERS

CROSS REFERENCE TO RELATED PATENTS/PATENT APPLICATIONS

The present U.S. Utility patent application claims priority pursuant to 35 U.S.C. § 119(e) to the following U.S. Provisional Patent Applications that are hereby incorporated herein by reference in their entirety and are made part of the present U.S. patent application for all purposes:

1. U.S. Provisional Patent Application Ser. No. 60/381,496, entitled "SAMPLE RATE REDUCTION IN DATA COMMUNICATION RECEIVERS," filed May 17, 2002, pending.

2. U.S. Provisional Patent Application Ser. No. 60/381,497, entitled "QUADRATURE RECEIVER SAMPLING ARCHITECTURE," filed May 17, 2002, pending.

The following U.S. Utility patent application, being filed concurrently, is hereby incorporated herein by reference in its entirety and made part of the present U.S. Utility patent application for all purposes:

1. U.S. Utility patent application Ser. No. 10/184,766, entitled "QUADRATURE RECEIVER SAMPLING ARCHITECTURE," filed Jun. 28, 2002, now U.S. Pat. No. 7,139,332 B2, issued on Nov. 21, 2006.

BACKGROUND OF THE INVENTION

1. Technical Field of the Invention

The invention relates generally to communication systems; and, more particularly, it relates to data communication systems employing analog and digital components.

2. Description of Related Art

Data communication systems have been long been under development. One particular design direction has been the movement towards always faster operating devices within the communication system. Particularly within receivers employed within digital communication systems, the rate at which an analog to digital converter (ADC) can properly sample a received analog signal is of some critical consideration. In order to enable regeneration/re-synthesize a digitally sampled signal into the analog signal that has been actually received and sampled by the ADC, then the sampling rate of the ADC needs to be clocked at a frequency at least twice the highest frequency component in the analog received signal. This will enable that the entirety of the received signal, at least up the "highest frequency component" of interest will be able to perform accurate regeneration of the received signal.

ADCs can prove to be very real estate consumptive components within semiconductor devices. Given their oftentimes large real estate consumption, the ADCs within a semiconductor device often also prove to be large consumers of power as well. Again, a main direction of effort within data communication systems has been to increase the rate at which data may be transmitted between devices within the communication system. The ADC can prove to be one of the bottlenecks within the communication system, in that, the rate at which the ADC can sample data will limit the maximum rate at which data may be transmitted to it without losing data in the analog to digital sampling process. However, as the operating frequency, or clock frequency at which the ADC is clocked continues to increase, the device actually consumes more power and dissipates more heat. This will inherently lead to the generation and introduction of noise, at the very least thermal noise, into the other components within such a semiconductor device including the ADC that is being clocked at a very high frequency. The typical direction of effort, in continually trying to increase the clock rate at which the ADC operates to sample an incoming analog signal, competes with some other design motivations including desires to consume less power, operate at lower frequencies, and other considerations.

In addition, given that most devices seek to operate at the highest possible frequency, there is inherently ties to the fabrication processes used to make the semiconductor devices that perform these functions. In typically manufacturing, not all of a semiconductor wafer is operable to support the highest operating frequency for which the fabrication was intended. Oftentimes, some of the semiconductor wafer is still usable, but not at the highest operation frequencies that were intended beforehand. Sometimes a majority of the semiconductor wafer needs to be discarded when there are insufficient low frequency applications that are candidates to use it. This situation would be viewed as having a relatively low yield, in that, some (or even a majority) of the semiconductor wafer may not be used to perform any practical application. This is based on the typical motivation that seeks to operate most devices at the highest possible frequency, and those devices that can operate only at the lower frequencies are simply not used.

Further limitations and disadvantages of conventional and traditional systems will become apparent through comparison of such systems with the invention as set forth in the remainder of the present application with reference to the drawings.

BRIEF SUMMARY OF THE INVENTION

Various aspects of the invention can be found in a data communication receiver. The data communication receiver is operable to perform data sampling at a reduced sampling rate. In certain embodiments, the present invention is operable to perform the digital sampling at a reduced rate and then to perform up-conversion of the digital data followed by filtering to generate an accurate estimate of the incoming data.

Certain aspects of the present invention may also be described as follows: the present invention performs digital sampling of analog data using a reduced sample rate. The reduction of sampling rate may be performed in a variety of ways that reduce the sampling rate by some factor; one way involves dividing the sample rate by two. In this reduction by two embodiment, the sample rate of an ADC is reduced by a factor of two; this is based on an assumption that the reduced sample rate is greater than twice the highest frequency component in the analog in-phase (I) and quadrature (Q) inputs thereby meeting the Nyquist sampling criterion for total signal recovery. The present invention is operable to employ a digital interpolation filter to increase (up-sample) the sample rate of a digital signal before it is input to a variable interpolation/decimation (VID) filter that is used to recover the transmitted symbols from the over-sampled data stream. This technique allows a front end of a communication receiver to be clocked at a sampling rate that is one-half of the typical sampling rate without affecting the performance of the VID filter.

The present invention provides for many advantages including reducing power dissipation within the device as well. Clearly, other benefits are also provided by the operation of sampling at a lower rate, including less heat production that may undesirably affect the operation of an overall device. In addition, by performing the clocking of the sample rate at a reduced frequency, the present invention allows for a use of an even greater yield of a semiconductor wafer. There are presently many instance where entire portions of a semiconductor wafer are not fully usable at the highest operating frequency for which it was fabricated; there may have been some deleterious effects introduced in the fabrication process that have limited the highest operating frequency. The present invention allows for many of these portions of the semiconductor wafer still to be used. A greater yield of the entire semiconductor wafer may be realized.

The Present invention is directed to apparatus and methods of operation that are further described in the following Brief Description of the Several Views of the Drawings, the Detailed Description of the Invention, and the claims. Other features and advantages of the Present invention will become apparent from the following detailed description of the invention made with reference to the accompanying drawings.

BRIEF DESCRIPTION OF THE SEVERAL VIEWS OF THE DRAWINGS

A better understanding of the invention can be obtained when the following detailed description of various exemplary embodiments is considered in conjunction with the following drawings.

DETAILED DESCRIPTION OF THE INVENTION

Figure 1A:
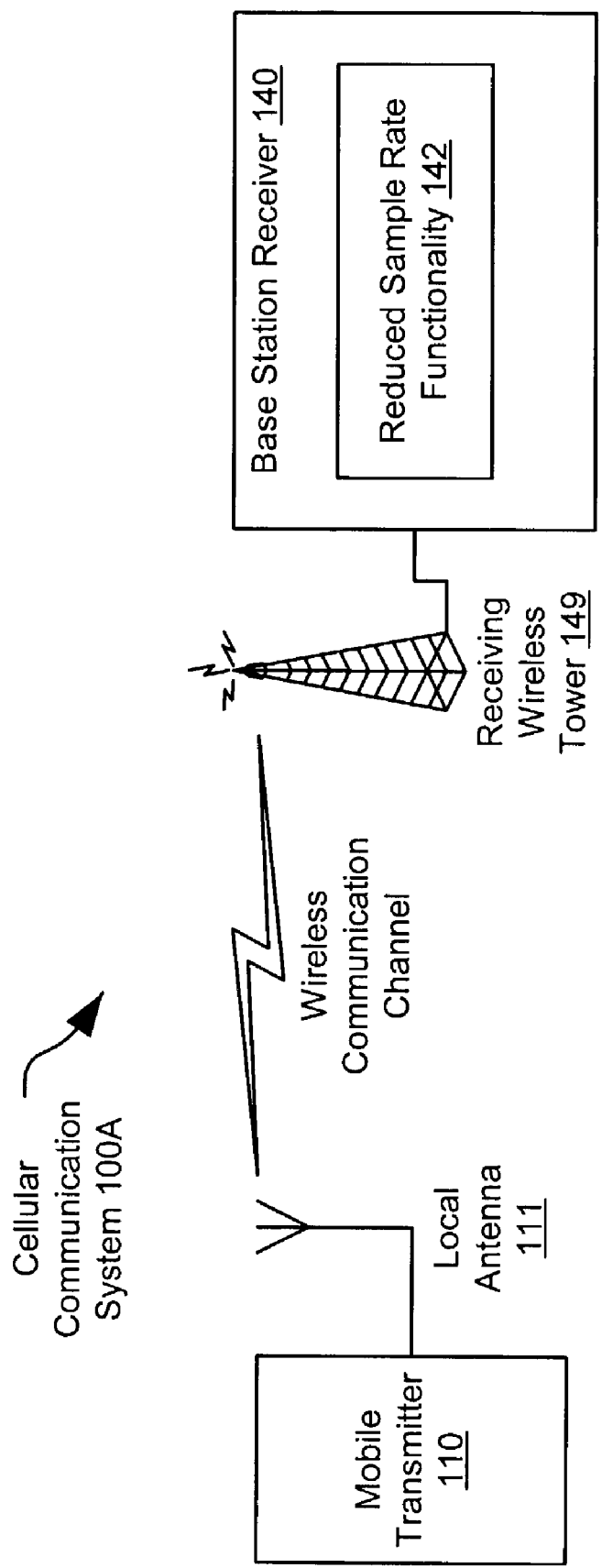
FIG. 1A is a system diagram illustrating an embodiment of a cellular communication system that is built according to the present invention.

FIG. 1A is a system diagram illustrating an embodiment of a cellular communication system 100A that is built according to the present invention. A mobile transmitter 110 has a local antenna 111. The mobile transmitter 110 may be any number of types of transmitters including a cellular telephone, a wireless pager unit, a mobile computer having transmit functionality, or any other type of mobile transmitter. The mobile transmitter 110 transmits a signal, using its local antenna 111, to a receiving wireless tower 149 via a wireless communication channel. The receiving wireless tower 149 is communicatively coupled to a base station receiver 140; the receiving wireless tower 149 is operable to receive data transmission from the local antenna 111 of the mobile transmitter 110 that have been communicated via the wireless communication channel. The receiving wireless tower 149 communicatively couples the received signal to the base station receiver 140.

The base station receiver 140 is operable to support reduced sample rate functionality 142. The reduced sample rate functionality 142 may be performed by clocking an ADC at a reduced sampling rate. In one embodiment, the sample rate of an ADC within the base station receiver 140 is reduced by a factor of two. The reduced sampling rate is greater than twice the highest frequency component in the analog input signal that is received via the wireless communication. Subsequently, the present invention is operable to perform signal processing that is necessary to recover the transmitted symbols from the over-sampled data stream. For example, in other embodiments, this technique of the present invention allows a front end of a communication receiver to be clocked at a sampling rate that is one-half of the typical sampling rate without affecting the performance of the VID filter. The many benefits provided by sampling at a reduced frequency including less heat generation, less power dissipation, and also allowing use of an even greater yield of a semiconductor wafer for use of the devices within the base station receiver 140. The FIG. 1A shows just one of the many embodiments in which reduced sample rate functionality, performed in accordance with the present invention, may be supported within a communication receiver.

Figure 1B:
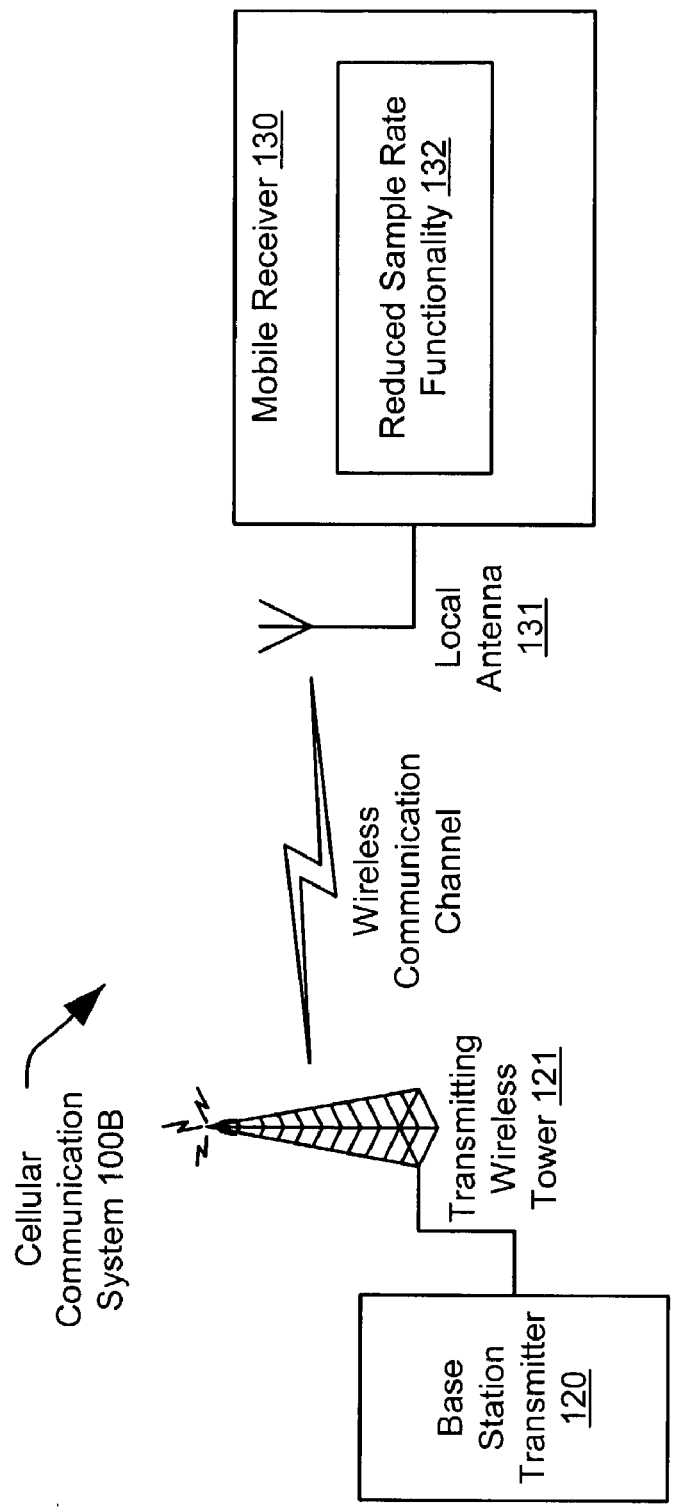
FIG. 1B is a system diagram illustrating another embodiment of a cellular communication system that is built according to the present invention.

FIG. 1B is a system diagram illustrating another embodiment of a cellular communication system 100B that is built according to the present invention. From certain perspectives, the FIG. 1B may be viewed as being the reverse transmission operation of the cellular communication system 100A of the FIG. 1A. A base station transmitter 120 is communicatively coupled to a transmitting wireless tower 121. The base station transmitter 120, using its transmitting wireless tower 121, transmits a signal to a local antenna 131 via a wireless communication channel. The local antenna 131 is communicatively coupled to a mobile receiver 130 so that the mobile receiver 130 is able to receive transmission from the transmitting wireless tower 121 of the base station transmitter 120 that have been communicated via the wireless communication channel. The local antenna 131 communicatively couples the received signal to the mobile receiver 130. It is noted that the mobile receiver 130 may be any number of types of transmitters including a cellular telephone, a wireless pager unit, a mobile computer having transmit functionality, or any other type of mobile transmitter.

The mobile receiver 130 is operable to support reduced sample rate functionality 132. The reduced sample rate functionality 132 may be performed by clocking an ADC at a reduced sampling rate. In one embodiment, the sample rate of an ADC within the mobile receiver 130 is reduced by a factor of two. The reduced sampling rate is greater than twice the highest frequency component in the analog input signal that is received via the wireless communication. Subsequently, the present invention is operable to perform signal processing that is necessary to recover the transmitted symbols from the over-sampled data stream. For example, in other embodiments, this technique of the present invention allows a front end of a communication receiver to be clocked at a sampling rate that is one-half of the typical sampling rate without affecting the performance of the VID filter. The many benefits provided by sampling at a reduced frequency including less heat generation, less power dissipation, and also allowing use of an even greater yield of a semiconductor wafer for use of the devices within the base station receiver 130. The FIG. 1B shows yet another of the many embodiments in which reduced sample rate functionality, performed in accordance with the present invention, may be supported within a communication receiver.

Figure 2:
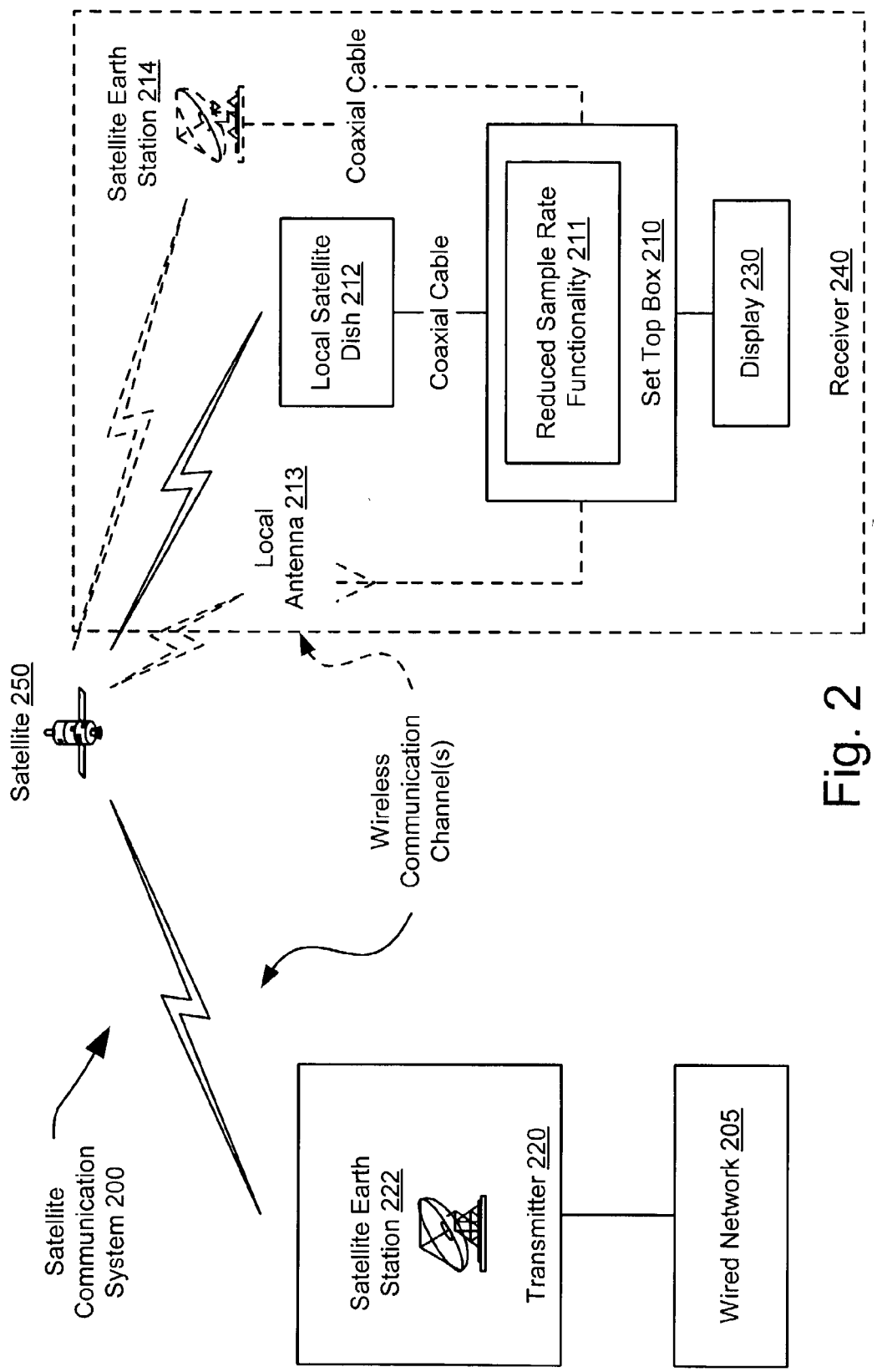
FIG. 2 is a system diagram illustrating an embodiment of a satellite communication system that is built according to the present invention.

FIG. 2 is a system diagram illustrating an embodiment of a satellite communication system 200 that is built according to the present invention. A transmitter 220 is communicatively coupled to a wired network 205. The wired network 205 may include any number of networks including the Internet, proprietary networks, and other wired networks. The transmitter 220 includes a satellite earth station 222 that is able to communicate to a satellite 250 via a wireless communication channel. The satellite 250 is able to communicate with a receiver 240. The receiver 240 may be a number of types of receivers, including terrestrial receivers such as satellite receivers, satellite based telephones, and satellite based Internet receivers.

In one embodiment, shown in the FIG. 2, the receiver 240 includes a local satellite dish 212. The local satellite dish 212 is used to communicatively couple a signal received from the satellite to a set top box 210. The set top box 210 may be any number of types of satellite interactive set top boxes; the set top box 210 may be an HDTV set top receiver or any other type of set top box without departing from the scope and spirit of the invention. Below within FIG. 4, a particular embodiment of an HDTV communication system is described. Moreover, in alternative embodiments, the satellite 250 is able to communicate with a local antenna 213 that communicatively couples to the set top box 210; in even other embodiments, the satellite 250 is able to communicate with a satellite earth station 214 that communicatively couples to the set top box 210.

Each of the local satellite dish 212, the local antenna 213, and the satellite earth station 214 is located on the earth. One of the local satellite dish 212, the local antenna 213, and the satellite earth station 214 is communicatively coupled to a set top box 210; the set top box is operable to support reduced sample rate functionality 211 that is performed in accordance with the present invention. The set top box 210 is operable to perform receiver functionality for proper demodulation and decoding of a signal received from the satellite 250 and communicatively coupled to the set top box 210 via at least one of the local satellite dish 212, the local antenna 213, and the satellite earth station 214.

Here, the communication to and from the satellite 250 may cooperatively be viewed as being a wireless communication channel, or each of the communication to and from the satellite 250 may be viewed as being two distinct wireless communication channels. For example, the wireless communication "channel" may be viewed as not including multiple wireless hops in one embodiment. In other embodiments, the satellite 250 receives a signal received from the satellite earth station 222, amplifies it, and relays it to one of the local satellite dish 212, the local antenna 213, and the satellite earth station 214. In the case where the satellite 250 receives a signal received from the satellite earth station 222, amplifies it, and relays it, the satellite 250 may be viewed as being a "transponder." In addition, other satellites may exist that perform both receiver and transmitter operations. In this case, each leg of an up-down transmission via the wireless communication channel would be considered separately. The wireless communication channel between the satellite 250 and a fixed earth station would likely be less time-varying than the wireless communication channel between the satellite 250 and a mobile station. In whichever of the local satellite dish 212, the local antenna 213, and the satellite earth station 214 is employed by the set top box 210 to receive the wireless communication from the satellite 250, the satellite 250 communicates with the set top box 210.

Again, the set top box 210 is able to support reduced sample rate functionality 211. The reduced sample rate functionality 211 may be performed by clocking an ADC at a reduced sampling rate. In one embodiment, the sample rate of an ADC within the set top box 210 is reduced by a factor of two. The reduced sampling rate is greater than twice the highest frequency component in the analog input signal that is received via the wireless communication. Subsequently, the present invention is operable to perform signal processing that is necessary to recover the transmitted symbols from the over-sampled data stream. For example, in other embodiments, this technique of the present invention allows a front end of a communication receiver to be clocked at a sampling rate that is one-half of the typical sampling rate without affecting the performance of the VID filter. The many benefits provided by sampling at a reduced frequency including less heat generation, less power dissipation, and also allowing use of an even greater yield of a semiconductor wafer for use of the devices within the set top box 210. The set top box 210 is communicatively coupled to a display 230. The display 230 may be a television, a computer display, or any other display that is operable to display a received and decoded signal that is received by at least one of the local satellite dish 212, the local antenna 213, and the satellite earth station 214. The FIG. 2 shows yet another of the many embodiments in which reduced sample rate functionality, performed in accordance with the present invention, may be supported within a communication receiver.

Figure 3A:
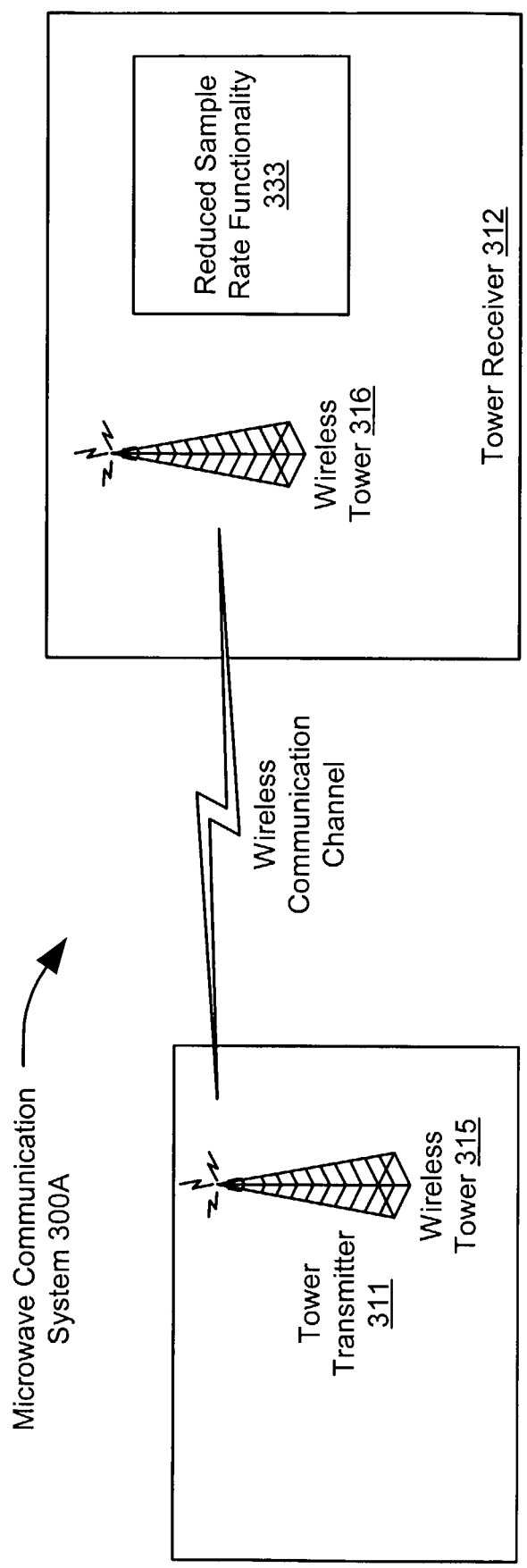
FIG. 3A is a system diagram illustrating an embodiment of a microwave communication system that is built according to the present invention.

FIG. 3A is a system diagram illustrating an embodiment of a microwave communication system 300A that is built according to the present invention. A tower transmitter 311 includes a wireless tower 315. The tower transmitter 311, using its wireless tower 315, transmits a signal to a tower receiver 312 via a wireless communication channel. The tower receiver 312 includes a wireless tower 316. The wireless tower 316 is able to receive transmissions from the wireless tower 315 that have been communicated via the wireless communication channel.

The tower receiver 312 is operable to support reduced sample rate functionality 333. The reduced sample rate functionality 333 may be performed by clocking an ADC at a reduced sampling rate. In one embodiment, the sample rate of an ADC within the tower receiver 312 is reduced by a factor of two. The reduced sampling rate is greater than twice the highest frequency component in the analog input signal that is received via the wireless communication. Subsequently, the present invention is operable to perform signal processing that is necessary to recover the transmitted symbols from the over-sampled data stream. For example, in other embodiments, this technique of the present invention allows a front end of a communication receiver to be clocked at a sampling rate that is one-half of the typical sampling rate without affecting the performance of the VID filter. The many benefits provided by sampling at a reduced frequency including less heat generation, less power dissipation, and also allowing use of an even greater yield of a semiconductor wafer for use of the devices within the tower receiver 312. The FIG. 3A shows just one of the many embodiments in which reduced sample rate functionality, performed in accordance with the present invention, may be supported within a communication receiver.

Figure 3B:
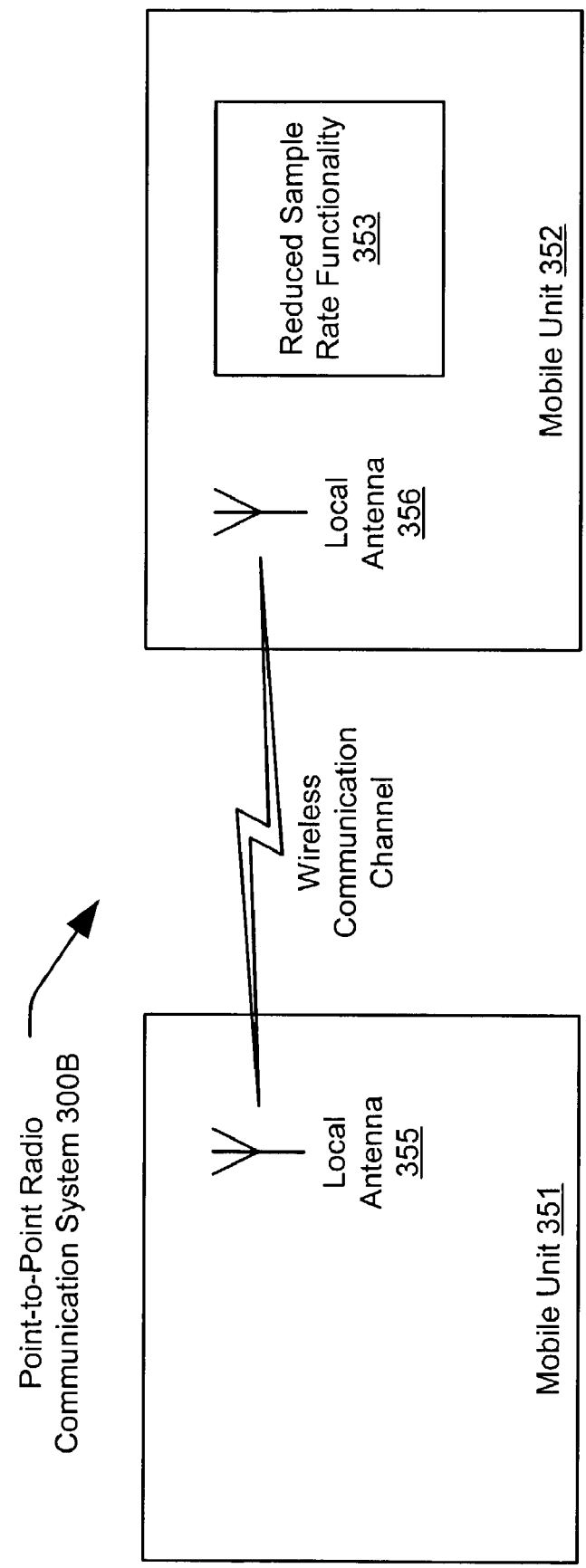
FIG. 3B is a system diagram illustrating an embodiment of a point-to-point radio communication system that is built according to the present invention.

FIG. 3B is a system diagram illustrating an embodiment of a point-to-point. radio communication system 300B that is built according to the present invention. A mobile unit 351 includes a local antenna 355. The mobile unit 351, using its local antenna 355, transmits a signal to a local antenna 356 via a wireless communication channel. The local antenna 356 is included within a mobile unit 352. The mobile unit 352 is able to receive transmissions from the mobile unit 351 that have been communicated via the wireless communication channel.

The mobile unit 352 is operable to support reduced sample rate functionality 353. The reduced sample rate functionality 353 may be performed by clocking an ADC at a reduced sampling rate. In one embodiment, the sample rate of an ADC within the mobile unit 352 is reduced by a factor of two. The reduced sampling rate is greater than twice the highest frequency component in the analog input signal that is received via the wireless communication. Subsequently, the present invention is operable to perform signal processing that is necessary to recover the transmitted symbols from the over-sampled data stream. For example, in other embodiments, this technique of the present invention allows a front end of a communication receiver to be clocked at a sampling rate that is one-half of the typical sampling rate without affecting the performance of the VID filter. The many benefits provided by sampling at a reduced frequency include less heat generation, less power dissipation, and also allowing use of an even greater yield of a semiconductor wafer for use of the devices within the mobile unit 352. The FIG. 3B shows yet another of the many embodiments in which reduced sample rate functionality, performed in accordance with the present invention, may be supported within a communication receiver.

Figure 4:
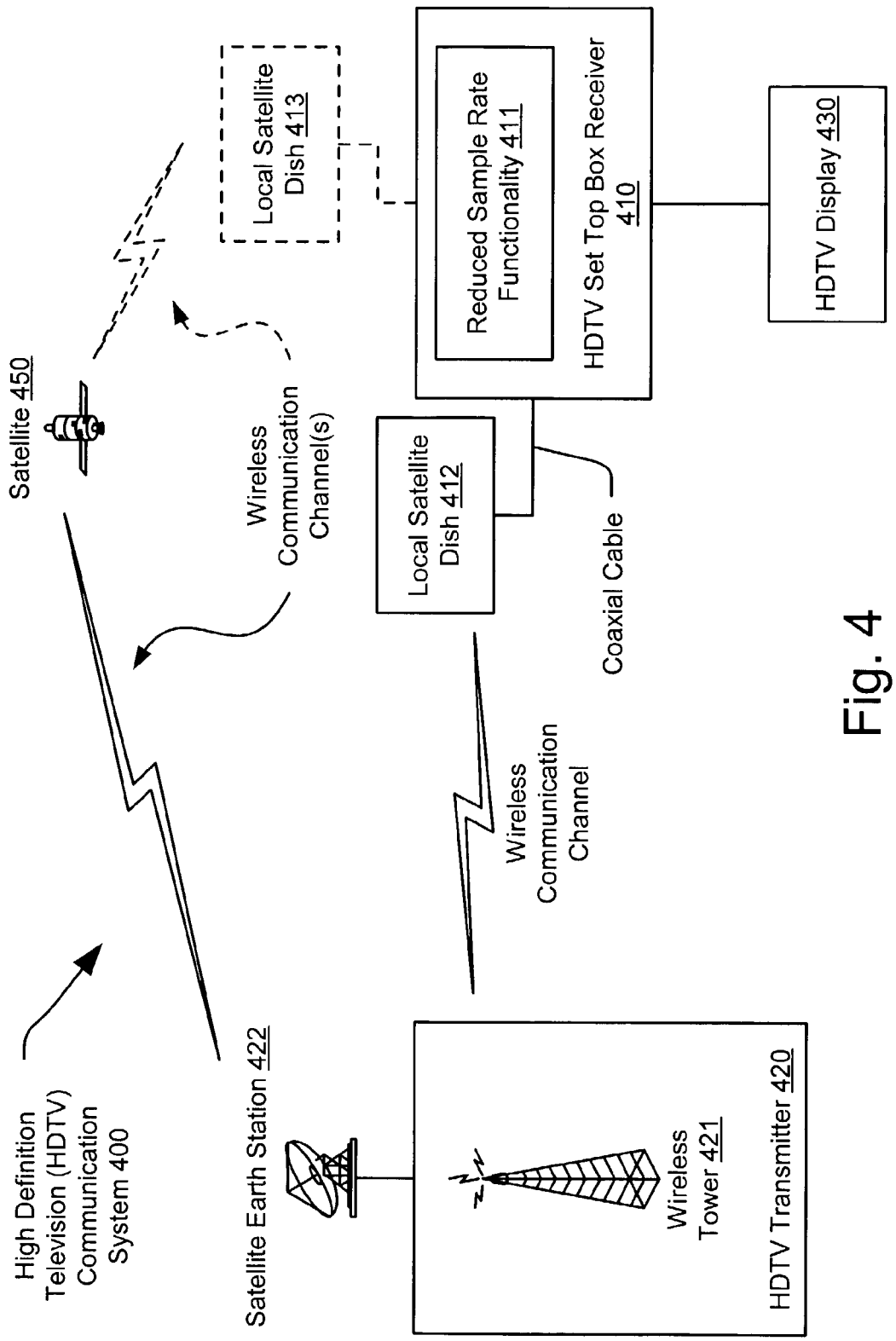
FIG. 4 is a system diagram illustrating an embodiment of a high definition television (HDTV) communication system that is built according to the present invention.

FIG. 4 is a system diagram illustrating an embodiment of a HDTV communication system 400 that is built according to the present invention. An HDTV transmitter 420 includes a wireless tower 421. The HDTV transmitter 420, using its wireless tower 421, transmits a signal to a local satellite dish 412 via a wireless communication channel. The local satellite dish 412 communicatively couples to an HDTV set top box receiver 410 via a coaxial cable. The HDTV set top box receiver 410 includes the functionality to receive the wireless transmitted signal. The HDTV set top box receiver 410 is also communicatively coupled to an HDTV display 430 that is able to display the demodulated and decoded wireless transmitted signals received by the HDTV set top box receiver 410. The HDTV transmitter 420 may transmit a signal directly to the local satellite dish 412 via the wireless communication channel. In alternative embodiments, the HDTV transmitter 420 may first receive a signal from a satellite 450, using a satellite earth station 422 that is communicatively coupled to the HDTV transmitter 420, and then transmit this received signal to the to the local satellite dish 412 via the wireless communication channel. In this situation, the HDTV transmitter 420 operates as a relaying element to transfer a signal originally provided by the satellite 450 that is destined for the HDTV set top box receiver 410. For example, another satellite earth station may first transmit a signal to the satellite 450 from another location, and the satellite 450 may relay this signal to the satellite earth station 422 that is communicatively coupled to the HDTV transmitter 420. The HDTV transmitter 420 performs receiver functionality and then transmits its received signal to the local satellite dish 412.

In even other embodiments, the HDTV transmitter 420 employs the satellite earth station 422 to communicate to the satellite 450 via a wireless communication channel. The satellite 450 is able to communicate with a local satellite dish 413; the local satellite dish 413 communicatively couples to the HDTV set top box receiver 410 via a coaxial cable. This path of transmission shows yet another communication path where the HDTV set top box receiver 410 may receive communication from the HDTV transmitter 420.

In whichever embodiment and whichever signal path the HDTV transmitter 420 employs to communicate with the HDTV set top box receiver 410, the HDTV set top box receiver 410 is operable to support reduced sample rate functionality 411. The reduced sample rate functionality 411 may be performed by clocking an ADC at a reduced sampling rate. In one embodiment, the sample rate of an ADC within the HDTV set top box receiver 410 is reduced by a factor of two. The reduced sampling rate is greater than twice the highest frequency component in the analog input signal that is received via the wireless communication. Subsequently, the present invention is operable to perform signal processing that is necessary to recover the transmitted symbols from the over-sampled data stream. For example, in other embodiments, this technique of the present invention allows a front end of a communication receiver to be clocked at a sampling rate that is one-half of the typical sampling rate without affecting the performance of the VID filter. The many benefits provided by sampling at a reduced frequency including less heat generation, less power dissipation, and also allowing use of an even greater yield of a semiconductor wafer for use of the devices within the HDTV set top box receiver 410. The FIG. 4 shows yet another of the many embodiments in which reduced sample rate functionality, performed in accordance with the present invention, may be supported within a communication receiver.

Figure 5:
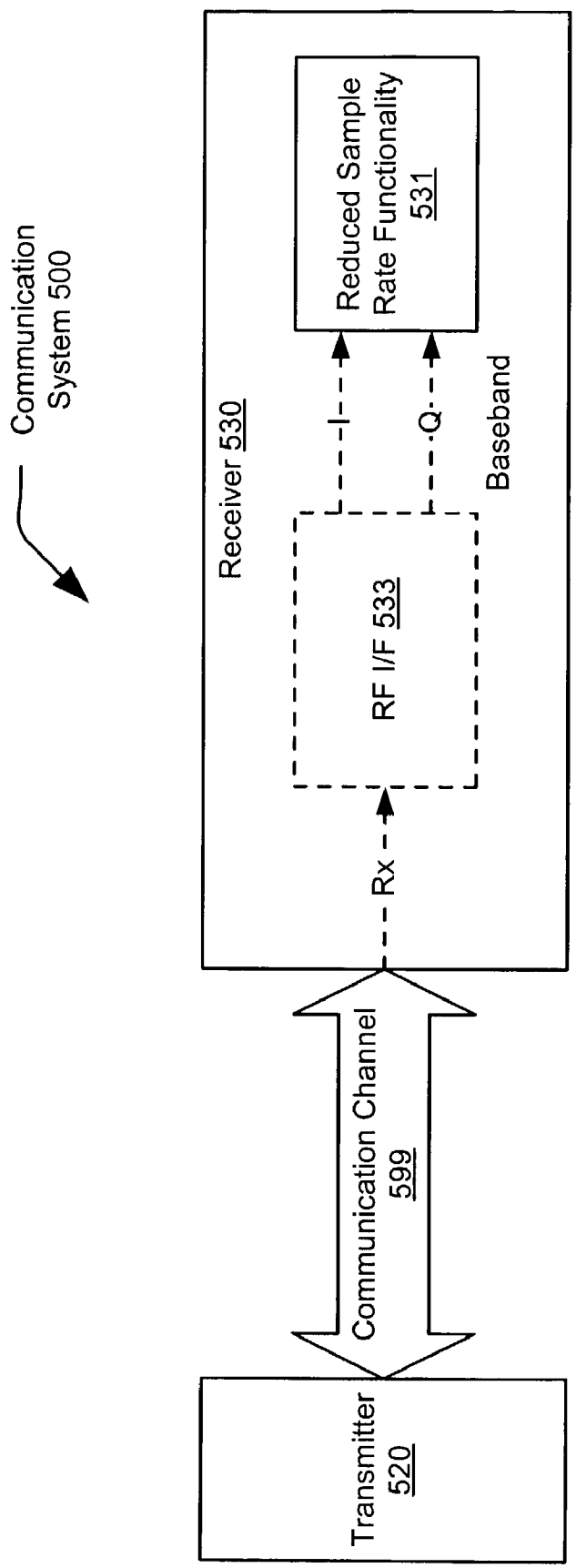
FIG. 5 is a system diagram illustrating an embodiment of a communication system that is built according to the present invention.

FIG. 5 is a system diagram illustrating an embodiment of a communication system 500 that is built according to the present invention. The FIG. 5 shows communicative coupling, via a communication channel 599, between a transmitter 520 and a receiver 530. The communication channel 599 may be a wireline communication channel or a wireless communication channel without departing from the scope and spirit of the invention.

The receiver 530 includes functionality to perform radio frequency interfacing (RF I/F) 533 to convert a received signal, received via the communication channel 599, down to a baseband frequency and to extract the I and Q data streams from the received signal. There a variety of ways to perform demodulation of a received signal down to baseband; for example, a received signal may be transformed into an intermediate frequency (IF) and then that IF may be transferred down to baseband. In doing so, the I and Q streams may then be extracted and provide to the functional block 531 that is operable to support reduced sample rate functionality. If desired in even other embodiments, other transformations may be performed in down-converting a received signal to baseband and extracting the I and Q streams from the received signal.

However, regardless of the manner in which the I and Q streams are extracted from the signal received via the communication channel 599, these I and Q data streams are provided to a functional block 531 that is operable to support reduced sample rate functionality. The reduced sample rate functionality 531 may be performed by clocking an ADC at a reduced sampling rate. In one embodiment, the sample rate of an ADC within the receiver 530 is reduced by a factor of two. The reduced sampling rate is greater than twice the highest frequency component in the analog input signal that is received via the communication channel 599. Subsequently, the present invention is operable to perform signal processing that is necessary to recover the transmitted symbols from the over-sampled data stream. For example, in other embodiments, this technique of the present invention allows a front end of a communication receiver to be clocked at a sampling rate that is one-half of the typical sampling rate without affecting the performance of the VID filter. The many benefits provided by sampling at a reduced frequency including less heat generation, less power dissipation, and also allowing use of an even greater yield of a semiconductor wafer for use of the devices within the receiver 530. The FIG. 5 shows yet another of the many embodiments in which reduced sample rate functionality, performed in accordance with the present invention, may be supported within a communication receiver.

Figure 6:
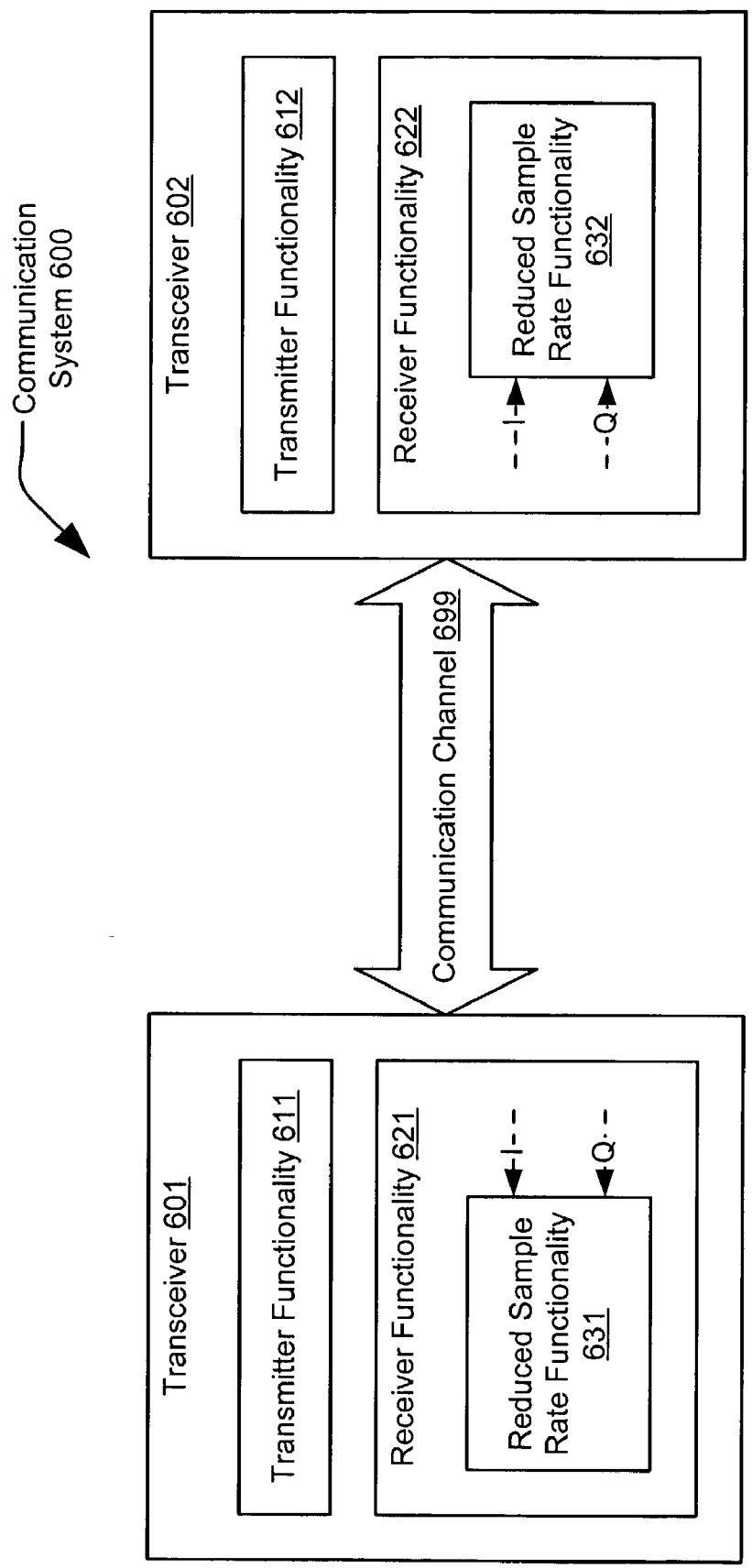
FIG. 6 is a system diagram illustrating another embodiment of a communication system that is built according to the present invention.

FIG. 6 is a system diagram illustrating an embodiment of a communication system 600 that is built according to the present invention. The FIG. 6 shows communicative coupling, via a communication channel 699, between two transceivers, a transceiver 601 and a transceiver 602. The communication channel 699 may be a wireline communication channel or a wireless communication channel without departing from the scope and spirit of the invention.

Each of the transceivers 601 and 602 includes transmitter functionality and receiver functionality. For example, the transceiver 601 includes transmitter functionality 611 and receiver functionality 621; the transceiver 602 includes transmitter functionality 612 and receiver functionality 622. The receiver functionalities 621 and 622, within the transceivers 601 and 602, respectively, are each operable to support reduced sample rate functionality, 631 and 632, in accordance with the present invention.

Each of the receiver functionalities 621 and 622 include functionality to extract I and Q data streams from signals received via the communication channel 699. The I and Q data streams may be generated from RF I/F that is operable to convert the received signals, received via the communication channel 699, down to the baseband frequency. Similar to the functionality described above for the RF I/F 533 shown in the FIG. 5, each of the receiver functionalities 621 and 622 in the FIG. 6 are operable to convert a received signal, received via the communication channel 699, down to a baseband frequency and to extract the I and Q data streams from the received signal. Again, there a variety of ways to perform demodulation of a received signal down to baseband; for example, a received signal may be transformed into an intermediate frequency (IF) and then that IF may be transferred down to baseband. In doing so, the I and Q streams may then be extracted and provided to the functional blocks 631 and 632 that are operable to support reduced sample rate functionality. If desired in even other embodiments, other transformations may be performed in down-converting a received signal to baseband and extracting the I and Q streams from the received signal within the receiver functionalities 621 and 622.

However, regardless of the manner in which the I and Q streams are extracted from the signal received via the communication channel 699, they are provided to the receiver functionalities 621 and 622. Within the transceiver 601, these I and Q data streams are provided to the functional block 631 in the receiver functionality 621 that is operable to support reduced sample rate functionality. Within the transceiver 602, these I and Q data streams are provided to the functional block 632 in the receiver functionality 622. The reduced sample rate functionalities 631 and 632 may be performed by clocking an ADC at a reduced sampling rate. In one embodiment, the sample rate of an ADC within at least one of the receiver functionality 621 or 622 is reduced by a factor of two. The reduced sampling rate is greater than twice the highest frequency component in the analog input signal that is received via the communication channel 699. Subsequently, the present invention is operable to perform signal processing that is necessary to recover the transmitted symbols from the over-sampled data stream. For example, in other embodiments, this technique of the present invention allows a front end of a communication receiver to be clocked at a sampling rate that is one-half of the typical sampling rate without affecting the performance of the VID filter. The many benefits provided by sampling at a reduced frequency including less heat generation, less power dissipation, and also allowing use of an even greater yield of a semiconductor wafer for use of the devices within the transceivers 601 and 602. The FIG. 6 shows yet another of the many embodiments in which reduced sample rate functionality, performed in accordance with the present invention, may be supported within a communication receiver.

It is noted here that while many of the embodiments described within this patent application describe those communication systems employing wireless communication channels, the present invention is equally applicable within wireline communication systems without degrading any performance. There are certain embodiments where even landline systems may have a dynamically changing communication channel. While this is clearly the case in wireless communication applications (dynamically changing communication channel), it may also occur in wireline communication applications as well. The various types of communication systems described herein may be wireless communication applications in some embodiments; they may also be wireline communication applications in other embodiments; alternatively, they may include various network components that are wireline and some that are wireless all without departing from the scope and spirit of the invention.

Figure 7:
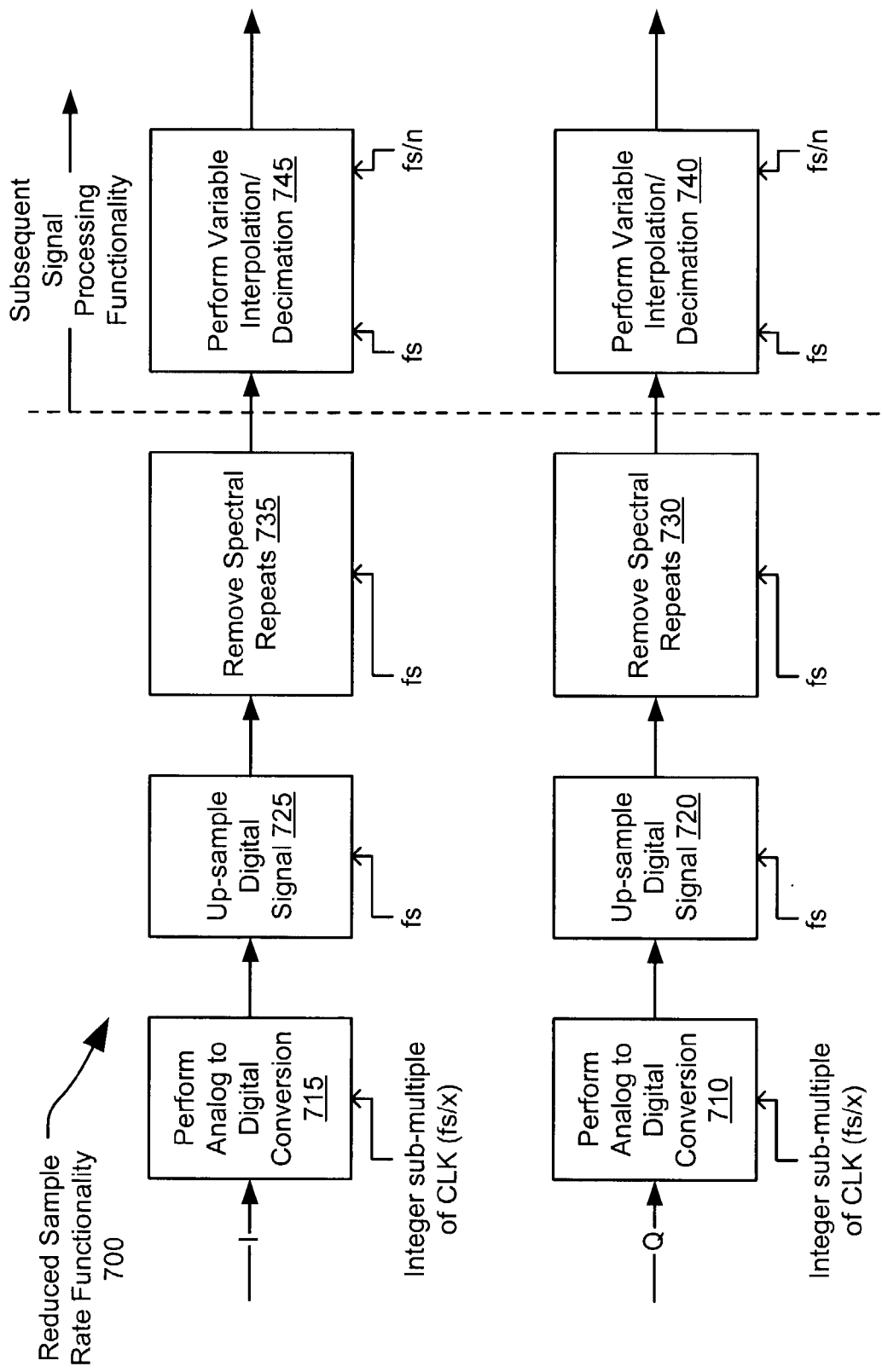
FIG. 7 is a functional block diagram illustrating an embodiment of reduced sample rate functionality that is performed according to the present invention.

FIG. 7 is a functional block diagram illustrating an embodiment of reduced sample rate functionality 700 that is performed according to the present invention. An I stream is provided to a functional block 715 that is operable to perform analog to digital conversion of the I stream. This functional block 715 is clocked at a frequency that is some sub-multiple of a clock (CLK) frequency. The CLK is reduced by some factor x. This reduced frequency (fs/x) is greater than twice the highest frequency component in the analog input signal I stream. Then, the now digital form of the I stream is up sampled in a functional block 725. This up-sampling, in the digital domain, is performed by the same factor x in which the CLK signal having a frequency fs was reduced in the functional block 715. This may be performed by inserting zeroes in between every symbol in the digital domain. Then, a functional block 735 is operable to remove any spectral repeats as shown in a functional block 735. This functional block 735 may be viewed as performing the function of a low pass filter (LPF) to remove these spectral repeats that are situated outside of the known spectral region in which information is expected to be found. This will result in the generation of an over-sampled signal in the digital domain; this may be viewed as performing digital interpolation filtering to increase the sample rate of the digital signal. The bandwidth of the operation in the functional block 735 will be governed by the factor x by which the sampling rate was reduced; this will provide information of the spectral region of significance.

Then, the output of the functional block 735 is provided to any subsequent signal processing functionality within the FIG. 7. The output of the functional block 735 is passed to a functional block 745 that is operable to perform variable interpolation/decimation (VID) filtering used to recover the transmitted symbols from the over-sampled data stream. The functionality of the functional block 745 is operable to receive a digital signal at sample rate fs and to down-convert it to a signal sampled at (fs/n), where n is some positive real number; the output frequency (fs/n) is some integer multiple of the symbol frequency fb. This technique allows the front end of a communication receiver to be clocked at reduced rate (fs/x) than the communication receiver would ordinarily be clocked without affecting the performance of the VID filtering functionality as shown in the functional block 745. Again, the ability to perform the analog to digital conversion as shown in the functional block 715 will provide many benefits including reducing power dissipation within a device that supports the reduced sample rate functionality 700 as shown in the FIG. 7. In certain embodiments, a communication receiver is clocked at a sampling rate that is one-half of the typical sampling rate (where x=2) thereby providing for the reduced sample rate functionality 700. Clearly, other factors may also be used to reduce the sample rate at which the analog to digital conversion is performed without departing from the scope and spirit of the invention.

The operations corresponding to an I stream are described above within the FIG. 7. Clearly, this operation is extendible to any received signal besides solely those that seek to perform sampling of I and Q streams within data communication receivers. For example, a single channel communication receiver may generically perform the functionality described above for the I stream on any received signal.

Within embodiments that do operate on both I and Q streams, the functionality described above for the I stream may also be extended to a Q stream as shown in the lower half of the FIG. 7. For example, the analog to digital conversion may be performed in a functional block 710 for the Q stream as well. This now digital format of the Q stream may be up-sampled as shown in a functional block 720. Then, any spectral repeats may be removed in a functional block 730, and any subsequent signal processing functionality may be performed including that shown in a functional block 740 of performing variable interpolation/decimation filtering used to recover the transmitted symbols from the over-sampled data stream.

Figure 8:
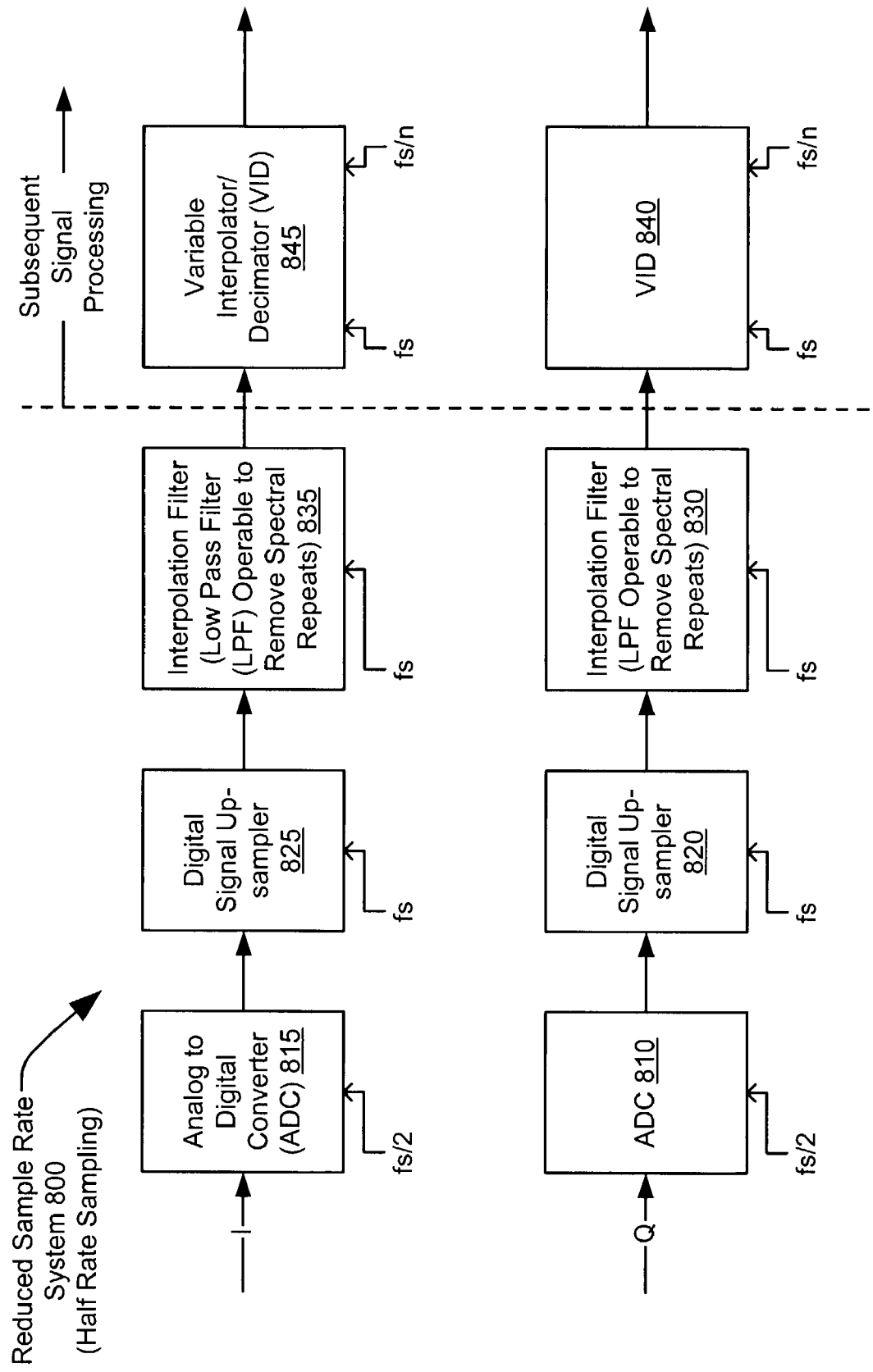
FIG. 8 is a system diagram illustrating an embodiment of a reduced sample rate system, performing half rate sampling, that is built according to the present invention.

FIG. 8 is a system diagram illustrating an embodiment of a reduced sample rate system 800, performing half rate sampling, that is built according to the present invention. An I stream is provided to an ADC 815 that is operable to perform analog to digital conversion of the I stream. This ADC 815 is clocked at a frequency that is some sub-multiple of a clock (CLK) frequency. The CLK is reduced by a factor of two. The reduced frequency (fs/2) is greater than twice the highest frequency component in the analog input signal I stream. Then, the now digital form of the I stream is provided to a digital up-sampler 825. This up-sampling, in the digital domain, is performed by the same factor of 2 by which the CLK signal having a frequency fs was reduced before performing the clocking of the ADC 815. This may be performed by inserting zeroes in between every symbol in the digital domain. Then, the output of the digital up-sampler 825, that has up-sampled the digital I stream by a factor of 2, is provided to an interpolation filter 835. The interpolation filter 835 is operable to remove any spectral repeats within the received and over-sampled digital signal provided by the digital up-sampler 825. The interpolation filter may be viewed as performing the function of a low pass filter (LPF) to remove these spectral repeats that are situated outside of the known spectral region in which information is expected to be found. This will result in the generation of an over-sampled signal in the digital domain; this may be viewed as performing digital interpolation filtering to increase the sample rate of the digital signal. The bandwidth of interest, within the interpolation filter 835, is governed by the factor of 2 by which the sampling rate was reduced before sampling the analog input I stream using the ADC 815; this will provide information of the spectral region of significance.

Then, the output of the interpolation filter 835 is provided to any subsequent signal processing functionality within the FIG. 8. The output of the interpolation filter 835 is passed to a variable interpolator/decimator (VID) 845 that is used to recover the transmitted symbols from the over-sampled data stream. The functionality of the VID 845 is operable to receive a digital signal having a frequency component fs and to down-convert it to a signal having a frequency component (fs/n), where n is some positive real number; the output frequency (fs/n) is some integer multiple of the symbol frequency fb. This technique allows the front end of a communication receiver to be clocked at reduced rate (fs/2 in this particular embodiment) than the communication receiver would ordinarily be clocked without affecting the performance of the VID 845. Again, the ability to perform the analog to digital conversion as shown by the ADC 815 will provide many benefits including reducing power dissipation within a device that includes the reduced sample rate system 800 as shown in the FIG. 8. In certain embodiments, a communication receiver is clocked at a sampling rate that is different than one-half of the typical sampling rate (where fs is sub-divided by some other factor besides 2). Clearly, other factors may also be used to reduce the sample rate at which the analog to digital conversion may be performed by the ADC 815 without departing from the scope and spirit of the invention.

The operations corresponding to an I stream are described above within the reduced sample rate system 800 of the FIG. 8. Clearly, the operation of the reduced sample rate system 800 is extendible within any system that receives a signal besides solely those that seek to perform sampling of I and Q streams within data communication receivers. For example, a single channel communication receiver may generically perform the functionality described above for the I stream on any received signal.

Within embodiments that do operate on both I and Q streams, the operations described above for the I stream may also be extended to a Q stream as shown in the lower half of the FIG. 8. For example, the analog to digital conversion may be performed in an ADC 810 for the Q stream as well. This now digital format of the Q stream may be up-sampled by a factor of 2 by the digital up-sampler 820. Then, any spectral repeats may be removed by the interpolation filter 830, and any subsequent signal processing functionality may be performed including that shown in a VID 840 that may be used to recover the transmitted symbols from the over-sampled data stream.

As also described within the U.S. Utility patent application Ser. No. 10/184,766, entitled "QUADRATURE RECEIVER SAMPLING ARCHITECTURE," filed Jun. 28, 2002, now U.S. Pat. No. 7,139,332 B2, issued on Nov. 21, 2006, which has been incorporated by reference above, instead of employing two separate analog to digital converters (ADCs) (i.e., one ADC which digitally samples only the in-phase component of the signal and another ADC which digitally samples only the quadrature component of the signal as shown in FIG. 7 and FIG. 8 herein), a single ADC may instead be employed that alternatively digitally samples each of the in-phase component of the signal and the quadrature component of the signal. For example, a single ADC may firstly digitally sample the in-phase component of the signal, then the single ADC may secondly digitally sample the quadrature component of the signal, then the single ADC may thirdly digitally sample the in-phase component of the signal, and so on.

Figure 9:
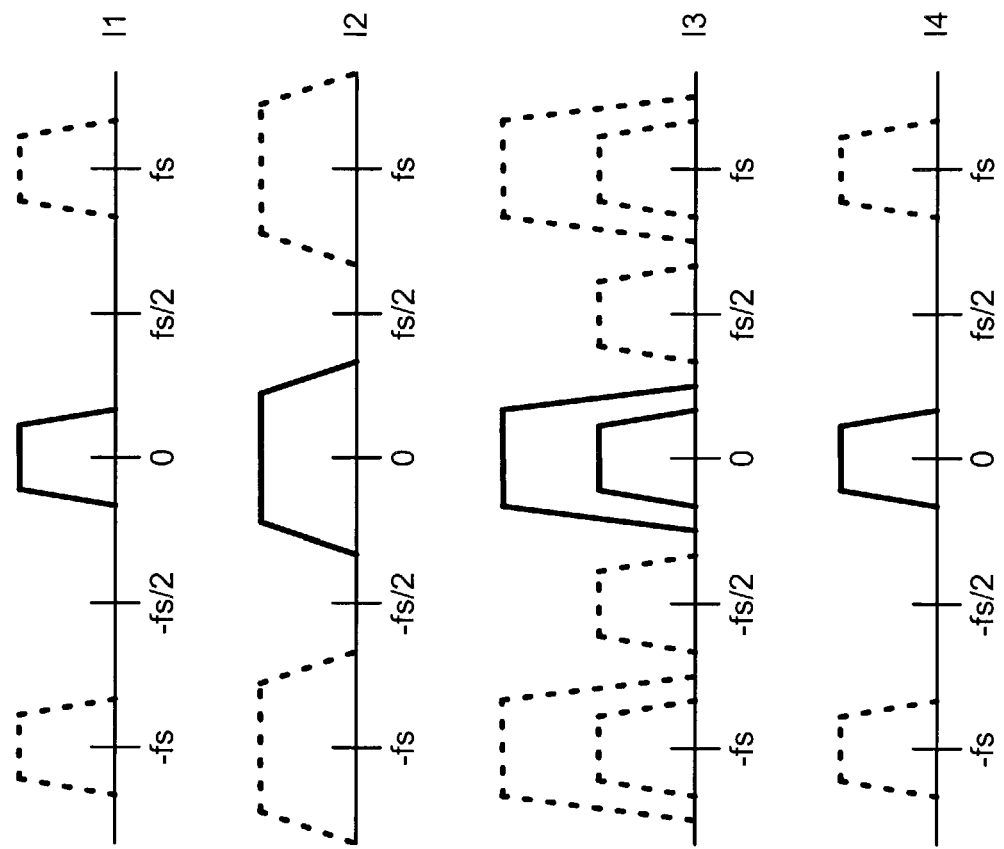
FIG. 9 is a diagram illustrating an embodiment of reduced sample rate signal processing, performing half rate sampling, that is performed according to the present invention.
Figure 9:
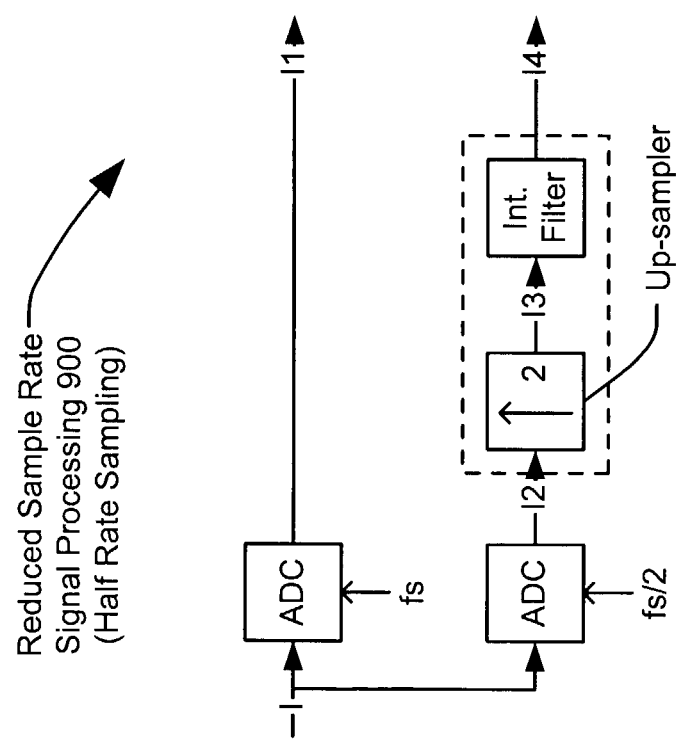

FIG. 9 is a diagram illustrating an embodiment of reduced sample rate signal processing 900, performing half rate sampling, that is performed according to the present invention. To illustrate the end result at which the present invention will arrive by employing the reduced sample rate signal processing that is performed in accordance with the present invention, the following description of an ADC being clocked at frequency fs is described. An analog input stream I is provided to the ADC that is clocked at a frequency fs that is greater than twice the highest frequency component in the analog input signal I stream. The digitally sampled I stream is shown as I1. The spectral properties of the sample show the true sample centered around zero, and two images centered around the frequency fs and −fs, respectively. A sampling window extending from fs/2 and −fs/2 would accurately be able to regenerate the received analog signal from the digitally sampled signal within this frequency range.

The present invention is operable to perform reduced sample rate signal processing 900, shown in this embodiment as being performing using an ADC that is clocked as a half rate sampling frequency (fs/2). The reduced frequency (fs/2) is greater than twice the highest frequency component in the analog input signal I stream. Clearly, other embodiments may perform sampling at other sub-multiples of the frequency fs. The I stream after passing through the ADC, it is shown as a signal I2. The signal I2 is similar to the signal I1, with the exception that it is spread across a much broader (specifically 2 times broader) frequency range. This I2 signal is then up-sampled by a factor of two. This up-sampling may be viewed as inserting zeroes in between the symbols of the I2 signal. The now over-sampled signal output from the factor of 2 up-sampler, shown as I3 has the spectral properties of having a number of spectral repeats, located and centered around the integer multiples of ±fs/2. This will result in the proper samples being of twice the magnitude that would be expected, shown around the origin and the frequency of i fs. An interpolation filter is operable to remove these spectral repeats and to recover the transmitted symbols from the over-sampled data stream. The finalized output signal, shown Is 14, now has comparable signal properties as I1. The present invention has been able to generate comparable signal properties of a digitally sampled signal while operating an ADC at a reduced sample rate.

Figure 10:
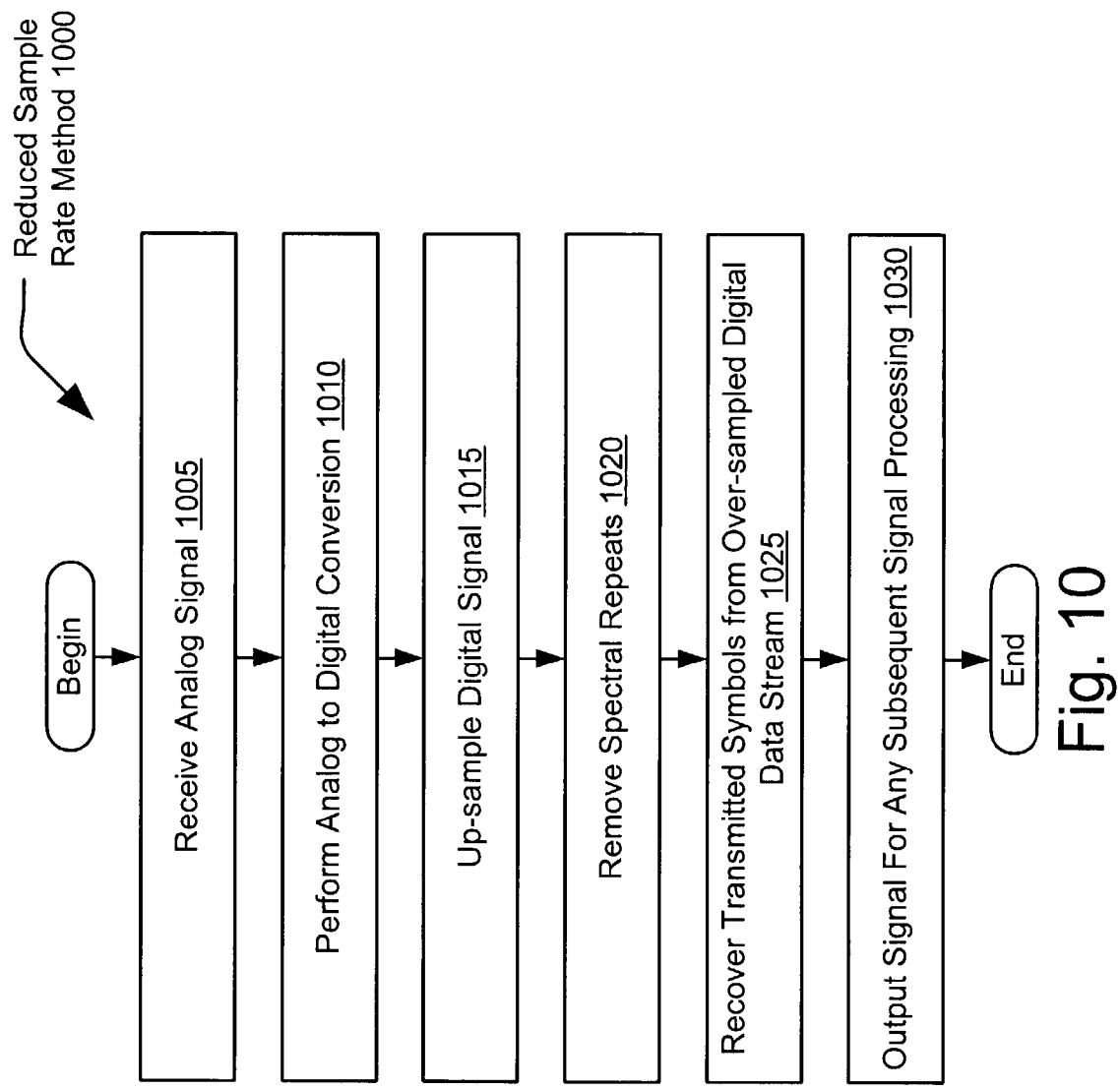
FIG. 10 is a flow diagram illustrating an embodiment of a reduced sample rate method that is according to the present invention.

FIG. 10 is a flow diagram illustrating an embodiment of a reduced sample rate method 1000 that is performed according to the present invention. In a block 1005, an analog signal is received. In a block 1010, the analog signal is converted to a digital signal via an analog to digital conversion. This now digital signal is then up-sampled as shown in a block 1015. Any introduced spectral repeats, introduced during the up-sampling of the digital data in the block 1015, are removed in a block 1020. This may be viewed as performing low pass filtering to remove the undesirable spectral repeats. After these spectral repeats are removed, then the digital output signal undergoes variable interpolation/decimation filtering in a block 1025 that may be used to recover the transmitted symbols from the over-sampled data stream. Subsequently, the output signal is provided to a block 1030.

It is also noted that the functionality, operations, and systems described above, in performing analog to digital conversion of more than one data stream may also be performed using the functionality and operations described within the U.S. patent application No. 60/381,497 entitled "QUADRATURE RECEIVER SAMPLING ARCHITECTURE,", that has above been incorporated by reference in its entirety and made part of the present U.S. patent application for all purposes. For example, any of the embodiments that perform analog to digital conversion of I and Q streams may employ one or more of the various embodiments to the quadrature receiver sampling architectures and methods described therein.

In view of the above detailed description of the invention and associated drawings, other modifications and variations will now become apparent. It should also be apparent that such other modifications and variations may be effected without departing from the spirit and scope of the invention.

What is claimed is:

1. A communication receiver, comprising:
an analog to digital converter that is operable to digitally sample a received analog signal to generate a digital signal;
an up-sampler, communicatively coupled to the analog to digital converter, that is operable to increase a sample rate of the digital signal thereby generating an over-sampled digital data stream;
an interpolation filter, communicatively coupled to the up-sampler, that is operable to remove a spectral repeat from the over-sampled digital data stream; and
a variable interpolation/decimation filter, communicatively coupled to the interpolation filter, that is operable to recover a transmitted symbol from the over-sampled digital data stream; and wherein:
the analog to digital converter being clocked at a first frequency that is greater than twice a highest frequency component in the received analog signal and that is less than a second frequency at which the up-sampler is clocked; and
up sampling, as performed by the up-sampler, is performed by a factor corresponding to a reduction in the first frequency at which the analog to digital converter being clocked as compared to the second frequency at which the up-sampler is clocked.

2. The communication receiver of claim 1, further comprising:
a radio frequency interface that is operable to extract at least one of an in-phase component and a quadrature component from the received analog signal; and wherein:
the analog to digital converter digitally samples the at least one of the in-phase component and the quadrature component.

3. The communication receiver of claim 2, wherein a single analog to digital converter alternatively digitally samples the at least one of the in-phase component and the quadrature component.

4. The communication receiver of claim 1, wherein the communication receiver comprises at least one of a base station receiver, a mobile receiver, a set top box, a tower receiver, a mobile unit, and an HDTV set top box receiver.

5. The communication receiver of claim 4, wherein at least one of the base station receiver and the tower receiver comprises a wireless tower.

6. The communication receiver of claim 4, wherein at least one of the set top box and the HDTV set top box receiver comprises a local satellite dish.

7. The communication receiver of claim 1, wherein the communication receiver is contained within a transceiver, the transceiver also comprises a communication transmitter.

8. The communication receiver of claim 1, wherein the analog signal is received via a wireless communication channel.

9. The communication receiver of claim 1, wherein the variable interpolation/decimation filter is operable to recover the transmitted symbol for use in estimating data within the received analog signal.

10. The communication receiver of claim 1, wherein the analog to digital converter being clocked at a frequency that is a sub-multiple of the highest frequency component in the received analog signal.

11. A communication receiver, comprising:
a radio frequency interface that is operable to extract at least one of an in-phase component and a quadrature component from a received analog signal;
an analog to digital converter that is operable to digitally sample at least one of the in-phase component and the quadrature component to generate a digital signal;
an up-sampler, communicatively coupled to the analog to digital converter, that is operable to increase a sample rate of the digital signal by a factor of two thereby generating an over-sampled digital data stream;
an interpolation filter, communicatively coupled to the up-sampler, that is operable to remove a spectral repeat from the over-sampled digital data stream; and
a variable interpolation/decimation filter, communicatively coupled to the interpolation filter, that is operable to recover a transmitted symbol from the over-sampled digital data stream; and wherein:
the analog to digital converter being clocked at a first frequency that is greater than twice a highest frequency component in the received analog signal and that is less than a second frequency at which the up-sampler is clocked;
the variable interpolation/decimation filter is operable to down-convert the sample rate to an integer multiple of a symbol frequency; and
up sampling, as performed by the up-sampler, is performed by the factor of two corresponding to a factor of two reduction in the first frequency at which the analog to digital converter being clocked as compared to the second frequency at which the up-sampler is clocked.

12. The communication receiver of claim 11, wherein the communication receiver is contained within a transceiver, the transceiver also comprises a communication transmitter.

13. The communication receiver of claim 11, wherein the analog signal is received via a wireless communication channel.

14. The satellite communication system of claim 11, wherein the communication receiver comprises at least one of a base station receiver, a mobile receiver, a set top box, a tower receiver, a mobile unit, and an HDTV set top box receiver; and
at least one of the set top box and the HDTV set top box receiver is communicatively coupled to a local satellite dish.

15. The satellite communication system of claim 11, wherein a single analog to digital converter alternatively digitally samples the at least one of the in-phase component and the quadrature component.

16. A set top box receiver, comprising:
an analog to digital converter that is operable to digitally sample a received analog signal to generate a digital signal, wherein the received analog signal is provided from a local satellite dish;
an up-sampler, communicatively coupled to the analog to digital converter, that is operable to increase a sample rate of the digital signal thereby generating an over-sampled digital data stream;
an interpolation filter, communicatively coupled to the up-sampler, that is operable to remove a spectral repeat from the over-sampled digital data stream; and
a variable interpolation/decimation filter, communicatively coupled to the interpolation filter, that is operable to recover a transmitted symbol from the over-sampled digital data stream for use in estimating data within the received analog signal; and wherein:
the analog to digital converter being clocked at a first frequency that is greater than twice a highest frequency component in the received analog signal and that is a sub-multiple of the highest frequency component in the received analog signal;
the first frequency is less than a second frequency at which the up-sampler is clocked; and
up sampling, as performed by the up-sampler, is performed by a factor corresponding to a reduction in the first frequency at which the analog to digital converter being clocked as compared to the second frequency at which the up-sampler is clocked.

17. The set top box receiver of claim 16, wherein:
the up-sampler is operable to increase the sample rate of the digital signal by a factor of two.

18. The set top box receiver of claim 16, further comprising:
a radio frequency interface that is operable to extract at least one of an in-phase component and a quadrature component from the received analog signal; and wherein:
the analog to digital converter digitally samples the at least one of the in-phase component and the quadrature component.

19. The set top box receiver of claim 16, wherein:
the local satellite dish is coupled to a satellite via a wireless communication channel.

20. The set top box receiver of claim 16, wherein:
the set top box receiver is an HDTV set top box receiver; and
the HDTV set top box receiver is coupled to an HDTV display.

21. The set top box receiver of claim 16, wherein:
the set top box receiver is an HDTV set top box receiver.

22. A communication receiver, comprising:
an analog to digital converter that is operable to digitally sample a received analog signal to generate a digital signal;
an up-sampler, communicatively coupled to the analog to digital converter, that is operable to increase the sample rate of the digital signal thereby generating an over-sampled digital data stream;
an interpolation filter, communicatively coupled to the up-sampler, that is operable to remove a spectral repeat from the over-sampled digital data stream; and
a variable interpolation/decimation filter, communicatively coupled to the interpolation filter, that is operable to recover a transmitted symbol from the over-sampled digital data stream for use in estimating data within the received analog signal; and wherein:
the analog to digital converter being clocked at a first frequency that is greater than twice a highest frequency component in the received analog signal and that is less than a second frequency at which the up-sampler is clocked; and
the up-sampling of the digital signal is performed by a factor of two; and up sampling, as performed by the up-sampler, is performed by the factor of two corresponding to a factor of two reduction in the first frequency at which the analog to digital converter being clocked as compared to the second frequency at which the up-sampler is clocked.

23. The communication receiver of claim 22, wherein:
the analog to digital converter being clocked at a frequency that is a sub-multiple of the highest frequency component in the received analog signal.

24. The communication receiver of claim 22, wherein:
the up-sampler is operable to increase the sample rate of the digital signal by a factor of two.

25. The communication receiver of claim 22, further comprising:
a radio frequency interface that is operable to extract an in-phase component and a quadrature component from the received analog signal; and wherein:
the analog to digital converter digitally samples the in-phase component and the quadrature component.

26. The communication receiver of claim 22, wherein:
the communication receiver is contained within a transceiver; and
the transceiver also includes a communication transmitter.

27. The communication receiver of claim 22, wherein:
the analog signal is received via a wireless communication channel.

28. The communication receiver of claim 23, wherein:
the communication receiver is at least one of a base station receiver, a mobile receiver, a set top box, a tower receiver, a mobile unit, and an HDTV set top box receiver.

29. A communication receiver, comprising:
a first analog to digital converter that is operable to digitally sample a received analog in-phase signal to generate an in-phase digital signal;
a second analog to digital converter that is operable to digitally sample a received analog quadrature signal to generate a quadrature digital signal;
a first up-sampler, communicatively coupled to the first analog to digital converter, that is operable to increase a sample rate of the in-phase digital signal thereby generating an over-sampled in-phase digital data stream;
a second up-sampler, communicatively coupled to the second analog to digital converter, that is operable to increase a sample rate of the quadrature digital signal thereby generating an over-sampled quadrature digital data stream;
a first interpolation filter, communicatively coupled to the first up-sampler, that is operable to remove a spectral repeat from the over-sampled in-phase digital data stream;
a second interpolation filter, communicatively coupled to the second up-sampler, that is operable to remove a spectral repeat from the over-sampled quadrature digital data stream; and
a first variable interpolation/decimation filter, communicatively coupled to the first interpolation filter, and a second variable interpolation/decimation filter, communicatively coupled to the second interpolation filter, that are cooperatively operable to recover a transmitted symbol from the over-sampled in-phase digital data stream and the quadrature in-phase digital data stream for use in estimating data within the received in-phase analog signal and the received quadrature analog signal; and wherein:
the first analog to digital converter being clocked at a first frequency that is greater than twice a highest frequency component in the received in-phase analog signal and that is less than a second frequency at which the first up-sampler is clocked;
the second analog to digital converter being clocked at a third frequency greater than twice a highest frequency component in the received quadrature analog signal and that is less than a fourth frequency at which the second up-sampler is clocked; and
up sampling, as performed by the first up-sampler, is performed by a factor corresponding to a reduction in the first frequency at which the first analog to digital converter being clocked as compared to the second frequency at which the first up-sampler is clocked.

30. The communication receiver of claim 29, wherein:
the highest frequency component in the received in-phase analog signal has a same frequency as the highest frequency component in the received quadrature analog signal;
the first frequency is the third frequency; and
each of the first analog to digital converter and the second analog to digital converter being clocked at the first frequency that is also a sub-multiple of the highest frequency component in the received in-phase analog signal.

31. The communication receiver of claim 29, wherein:
the first up-sampler is operable to increase the sample rate of the in-phase digital signal by a factor of two; and
the second up-sampler is operable to increase the sample rate of the quadrature digital signal by a factor of two.

32. The communication receiver of claim 29, further comprising:
an input that is operable to receive an analog signal; and
a radio frequency interface that is operable to extract the received analog in-phase signal and the received analog quadrature signal from the received analog signal.

33. The communication receiver of claim 29, wherein:
the communication receiver is contained within a transceiver; and
the transceiver also includes a communication transmitter.

34. The communication receiver of claim 29, wherein:
the analog signal is received via a wireless communication channel.

35. The communication receiver of claim 29, wherein:
the communication receiver is at least one of a base station receiver, a mobile receiver, a set top box, a tower receiver, a mobile unit, and an HDTV set top box receiver.

* * * * *